US008214467B2

(12) United States Patent
Dake et al.

(10) Patent No.: US 8,214,467 B2
(45) Date of Patent: Jul. 3, 2012

(54) MIGRATING PORT-SPECIFIC OPERATING PARAMETERS DURING BLADE SERVER FAILOVER

(75) Inventors: Gregory W. Dake, Durham, NC (US); Eric R. Kern, Chapel Hill, NC (US); Andrew B. McNeill, Jr., Cary, NC (US); Norman C. Strole, Raleigh, NC (US); Theodore B. Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/957,172

(22) Filed: Dec. 14, 2007

(65) Prior Publication Data
US 2009/0157851 A1 Jun. 18, 2009

(51) Int. Cl.
G06F 15/177 (2006.01)
(52) U.S. Cl. ........ 709/220; 709/221; 709/227; 709/228; 370/351; 714/15
(58) Field of Classification Search .................. 709/220, 709/221, 227, 228; 370/351; 714/15
See application file for complete search history.

(56) References Cited

U.S. PATENT DOCUMENTS

| | | | |
|---|---|---|---|
| 6,240,533 B1 | 5/2001 | Slemmer | |
| 6,424,700 B1 | 7/2002 | Thibon et al. | |
| 6,798,875 B2 | 9/2004 | DuCharme | |
| 7,096,383 B2 | 8/2006 | Talaugon et al. | |
| 7,197,660 B1 | 3/2007 | Liu et al. | |
| 2005/0201406 A1* | 9/2005 | Sekine et al. ................. | 370/432 |
| 2005/0256942 A1* | 11/2005 | McCardle et al. ............ | 709/220 |
| 2006/0074957 A1* | 4/2006 | Yamamoto et al. ........... | 707/101 |
| 2006/0230103 A1* | 10/2006 | Takamoto et al. ............ | 709/203 |
| 2007/0025306 A1* | 2/2007 | Cox et al. ...................... | 370/338 |
| 2007/0180314 A1* | 8/2007 | Kawashima et al. ........... | 714/15 |
| 2007/0189201 A1* | 8/2007 | Feder et al. .................... | 370/328 |
| 2007/0245110 A1* | 10/2007 | Shibayama et al. .......... | 711/165 |
| 2008/0162800 A1* | 7/2008 | Takashige et al. ............ | 711/104 |
| 2008/0205377 A1* | 8/2008 | Chao et al. .................... | 370/351 |
| 2009/0240790 A1* | 9/2009 | Utsunomiya et al. ......... | 709/221 |
| 2010/0100760 A1* | 4/2010 | Goto et al. ........................ | 714/3 |

OTHER PUBLICATIONS http://www.proxicast.com/products/LC2/Ic2.htm.

* cited by examiner

Primary Examiner — Yves Dalencourt
Assistant Examiner — Michael C Lai
(74) Attorney, Agent, or Firm — Edward J. Lenart; Cynthia G. Seal; Biggers & Ohanian, LLP

(57) ABSTRACT

Migrating port-specific operating parameters during blade server failover including querying, by a system management server of a data center, a switch for port-specific operating parameters of a first port, the data center comprising blade servers coupled for data communications to one another and to the system management server by a network, the system management server comprising a computer subsystem that automates server management processes in the data center, the switch comprising a data communications component of the network, the switch comprising ports, the ports comprising physical points of connection between the switch and blade servers, each port having associated port-specific operating parameters, the switch connected at the first port to a failing blade server; and assigning, by the system management server, the port-specific operating parameters to a second port in a same switch or another switch connected at the second port to a replacement blade server.

16 Claims, 3 Drawing Sheets

MIGRATING PORT-SPECIFIC OPERATING PARAMETERS DURING BLADE SERVER FAILOVER

BACKGROUND OF THE INVENTION

1. Field of the Invention

The field of the invention is data processing, or, more specifically, methods, apparatus, and products for migrating port-specific operating parameters during blade server failover.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Blade computers are increasingly being used to run critical applications that require a high level of redundancy and fault tolerance. Various clustering solutions exist such as VMware's high availability and Microsoft's clustering technology, but these systems are often complex and high priced. To provide redundancy and fault tolerance, a failing blade computer may be replaced automatically in process called blade failover. During such a blade failover, the failing blade computer's operating system is migrated from the failing blade computer to the replacement blade computer. The network infrastructure connecting the failing blade computer may include various port-specific operating parameters associated with a port on a network switch at which the failing blade computer is connected. Such port-specific operating parameters may include Quality of Service ('QoS') settings for Ethernet ports, Virtual Local Area Network ('VLAN') settings for Ethernet ports, N_port ID Virtualization ('NPIV') parameters for Fibre Channel ports, and others as will occur to those of skill in the art. These port-specific operating parameters also need to be migrated from the failing blade computer to the replacement blade computer during failover.

SUMMARY OF THE INVENTION

Methods, apparatus, and products for migrating port-specific operating parameters during blade server failover are disclosed that include querying, by a system management server of a data center, a switch for port-specific operating parameters of a first port, the data center comprising blade servers coupled for data communications to one another and to the system management server by a network, the system management server comprising a computer subsystem that automates server management processes in the data center, the switch comprising a data communications component of the network, the switch comprising ports, the ports comprising physical points of connection between the switch and blade servers, each port having associated port-specific operating parameters, the switch connected at the first port to a failing blade server; and assigning, by the system management server, the port-specific operating parameters to a second port in a same switch or another switch connected at the second port to a replacement blade server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
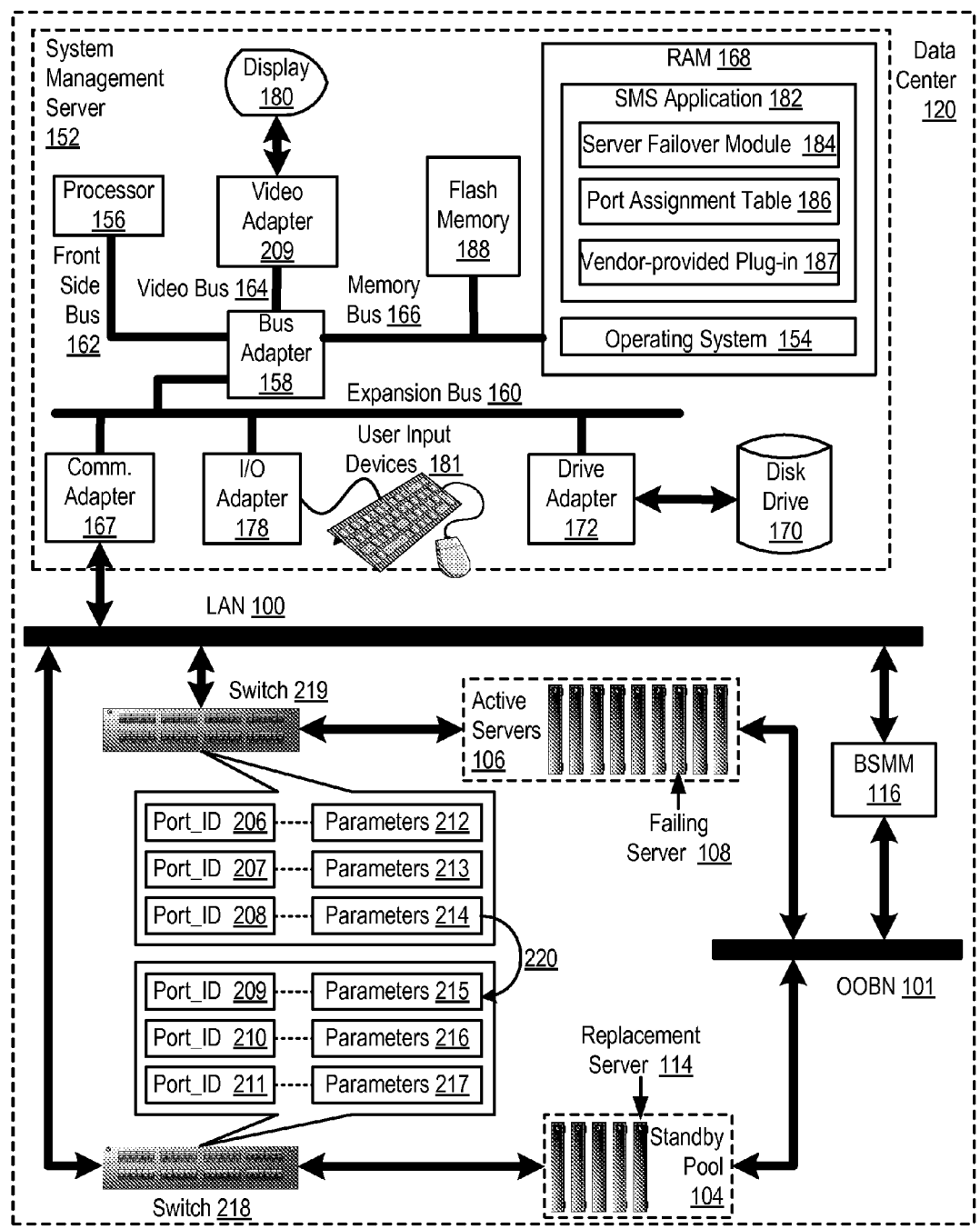
FIG. 1 sets forth a functional block diagram of an exemplary system implementing migrating port-specific operating parameters during blade server failover.

Exemplary methods, apparatus, and products for migrating port-specific operating parameters during blade server failover in accordance with the present invention are described with reference to the accompanying drawings, beginning with FIG. 1. FIG. 1 sets forth a functional block diagram of an exemplary system that migrates port-specific operating parameters during blade server failover according to embodiments of the present invention. The exemplary system of FIG. 1 includes a data center (120) that, in turn, includes a system management server (152) and several blade servers (104,106). The data center (120) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power), virtualized (iSCSI storage, remote console over IP), or discarded entirely (serial ports). The blade itself becomes simpler, smaller, and amenable to dense installation with many blade servers in a single blade enclosure.

The example system of FIG. 1 includes a number of servers, active blade servers (106), a pool (104) of available standby blade servers, and a system management server (152). An active blade server (106) is a blade server presently in use to provide responses to user requests for data processing services from the data center (120). The example system of FIG. 1 also includes a pool (104) of available standby blade servers. A standby blade server is a blade server that is not presently in use to provide responses to user requests for data processing services from the data center (120) but is available to be brought into active service upon failure of an active blade server.

The example system of FIG. 1 includes a blade server management module (116), an aggregation of computer hardware and software that is installed in a blade enclosure or blade center to provide support services for blade servers in the blade enclosure. Support services provided by the blade server management module (116) include monitoring health of blade servers and reporting health statistics to a system management server, power management and power control, save and restore configurations, discovery of available blade servers, event log management, memory management, and so on. An example of a blade server management module that can be used in systems that migrate port-specific operating parameters during blade server failover according to embodiments of the present invention is IBM's Advanced Management Module ('AMM'). The blade server management module (116) in this example communicates with a system management server (152) through a local area network ('LAN') (100), and the blade server management module (116) communicates with the blade servers (106, 104) through an out-of-band network (101). The LAN may be implemented as an Ethernet, an IP (Internet Protocol) network, or the like, and the out-of-band network (101) may be implemented as an Inter-Integrated Circuit ('I²C') bus, a System Management Bus ('SMBus'), an Intelligent Platform Management Bus ('IPMB'), or the like.

Each of the blade servers (106) in the system of FIG. 1 are connected to the LAN (100) for data communications through a switch (219). Blade servers (104) are also connected for data communications to the LAN (100) through another switch (218). A switch is a computing device that connects network segments. Low-end network switches appear nearly identical to network hubs, but a switch typically contains more intelligence than a network hub. Network switches, for example, are capable of inspecting data packets as they are received, determining the source and destination device of the packets and forwarding the packets appropriately. Switches useful in systems that migrate port-specific operating parameters during blade server failover according to embodiments of the present invention may include, for example, Ethernet switches, Fibre Channel switches, and other types of switches as will occur to those of skill in the art. Each switch (218,219) in the system of FIG. 1 includes several ports, physical points of connection between the blade servers and the switch. Each port has a port identification, typically a port number, that identifies the actual physical connection point between the switch and a blade server.

In addition to typical data packet forwarding, switches according to embodiments of the present invention may also maintain associations of one or more parameters and particular ports of the switch. Such parameters are referred to in this specification as 'port-specific operating parameters.' A port-specific parameter is a data value associated with a port that advises the port's switch how to operate the port. The port-specific operating parameters are 'port-specific' in the sense that a switch may include a number of ports, each of which can have separate operating parameters, each of which can therefore be operated differently depending on the system requirements of the network in which the switch operates. These port-specific operating parameters may be set, modified, and managed by a system management server (152) through the switch itself. Such port-specific operating parameters may include, for example, Quality of Service ('QoS') settings for Ethernet ports, Virtual Local Area Network ('VLAN') settings for Ethernet ports, N_Port ID Virtualization ('NPIV') parameters for Fibre Channel ports, and so on as will occur to those of skill in the art.

The system of FIG. 1 includes an exemplary system management server (152) useful in migrating port-specific operating parameters during blade server failover according to embodiments of the present invention. The system management server (152) is a server of the data center (120) that automates many of the processes that are required to proactively manage servers in the data center, including capacity planning, asset tracking, preventive maintenance, diagnostic monitoring, troubleshooting, firmware updates, blade server failover, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management server application program (182), a set of computer program instructions that operate the system management server so as to automatically under program control carry out processes required to manage servers in the data center, including capacity planning, asset tracking, preventive maintenance, diagnostic monitoring, troubleshooting, firmware updates, blade server failover, and so on. An example of a system management server application program (182) that can be improved to migrate port-specific operating parameters during failover of blade servers in a data center according to embodiments of the present invention is IBM's 'Director.'

Also stored in RAM (168) is a server failover module (184), a module of computer program instructions for automatic administration of blade server failover. The transfer of operation from a failing active blade server (108) to an available standby blade server (114) so as to ensure uninterrupted data flow, operability, and data processing services for users of the data center is referred to in this specification as 'failover.' Failover is the automated substitution of a functionally equivalent standby blade server for a failing active blade server. Failures that lead to failover can include a loss of power to an active blade server, a memory fault in an active blade server, a processor defect in an active blade server, loss of network connectivity for an active blade server, and so on. The data center (120) in this example provides automated failover from a failing active blade server to a standby blade server through the server failover module (184) of the system management server (152). An example of a server failover module that can be improved for failover of blade servers in a data center according to embodiments of the present invention is IBM's 'Boot From SAN Blade Failover Extension for IBM Director.'

Also stored in RAM (168) is an operating system (154). Operating systems useful for migrating port-specific operating parameters during blade server failover according to embodiments of the present invention include UNIX™, Linux™, Microsoft XP™, AIX™, IBM's i5/OS™, and others as will occur to those of skill in the art. The operating system (154), the system management server application (182), the server failover module (184), and the SMI-S provider interface (186) in the example of FIG. 1 are shown in RAM (168), but many components of such software typically are stored in non-volatile memory also, such as, for example, on a disk drive (170) or in flash memory (188).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in system management servers that migrate port-specific operating parameters during blade server failover according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory) (188), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary system management server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for migrating port-specific operating parameters during blade server failover according to embodiments of the present invention include modems for wired dial-up communications, Ethernet (IEEE 802.3) adapters for wired data communications network communications, and 802.11 adapters for wireless data communications network communications.

The example system management server of FIG. 1 operates generally to migrate port-specific operating parameters during blade server failover according to embodiments of the present invention by querying at least one switch (219) connected at one or more ports to a failing blade server (108) for port-specific operating parameters of the one or more ports connecting the failing blade server (108) and assigning, in at least one switch (219) connected at one or more ports to a replacement blade server (114), the port-specific operating parameters to the one or more ports connecting the replacement blade server (114).

The example system management server (152) of FIG. 1 may query at least one switch (219) connected at one or more ports to a failing blade server (108) for port-specific operating parameters of the one or more ports by, for each switch in a chassis in which the failing blade server is installed: determining, from a data structure associating slot numbers and port identifications, one or more port identifications associated with a slot number of the failing blade server and querying the switch for port-specific operating parameters using the determined port identifications associated with the slot number of the failing blade. The physical location in which a blade server is installed in a chassis is referred to as a slot. Each slot is represented by a slot number. The slot number of the failing blade server represents the physical location of the failing blade server in a chassis in the data center (120). When a blade server fails the BSMM monitoring the health of the blade server identifies the failure and sends an event notification to the system management server (152). Such an event notification typically includes a slot number of the failing blade server.

In typical blade server chassis, each port of a switch installed in the chassis is physically connected to a single slot and any blade server installed in that slot will be connected to the switch at that port. The system management server (152), therefore, maintains a port assignment table (186) that includes associations of port identifications of a switch, specifically port numbers, and slot numbers that connect to the ports. The associations of ports and slots may vary between chassis types. Port 4 of an Ethernet switch installed in IBM's BladeCenter HT chassis, for example, may be permanently physically connected to slot 5 in the chassis. As an alternative to having associations of ports and slots defined in accordance with a chassis type, a user may specify associations, and therefore actual physical connections, between the ports of a switch and slots in the chassis.

The example system management server (152) of FIG. 1 may assign the port-specific operating parameters to the one or more ports connecting the replacement blade server by sending, to a vendor-provided plug-in for the switch connected to the replacement blade server, an instruction to assign the port-specific operating parameters to the one or more ports of the switch connected to the replacement blade server. The plug-in (187) in FIG. 1 is installed as part of the system management server. A plug-in is a module of computer program instructions that interacts with a host application, such as a web browser or an email client, for example, to provide a very specific function on demand. Software applications, such as the system management server support plug-ins for many reasons. Some of the reasons include: enabling third-party developers to create capabilities to extend the software application, to support features yet unforeseen, reducing the size of the software application, and separating source code from the software application because of incompatible software licenses. The vendor-provided plug-in is a module of computer program instructions that extends the capabilities of the system management server application in that the plug-in is capable of receiving queries for port-specific operating parameters of a particular switch and retrieving such parameters. Accessing port-specific operating parameters on switches having various vendors may require vendor specific computer program instructions for each switch. To reduce complexity and size of the system management server application, a user may install only a single vendor plug-in for each switch currently in use in the data center, where each vendor plug-in provides the necessary computer program instructions for querying and assigning port-specific operating parameters for a particular switch.

As mentioned above, the switches (218,219) maintain associations of port identifications and port-specific operating parameters. In the system of FIG. 1, for example, switch (219) includes association of port identifications (206,207, 208) and parameters (212,213,214). Also in the system of FIG. 1, switch (218) includes associations of port identifications (209,210,211) and parameters (215,216,217). Assume for purposes of explanation that the port-specific operating parameters (214) associated with the port identification (208) are parameters for the failing blade server (108). Assigning the port-specific operating parameters to the one or more ports connecting the replacement blade server may include assigning (220) the parameters (214) associated with the port identification (208) as the parameters (215) associated with the port identification (209). The assignment effectively migrates the failing blade server's port-specific operating parameters to the port connecting the replacement blade server.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
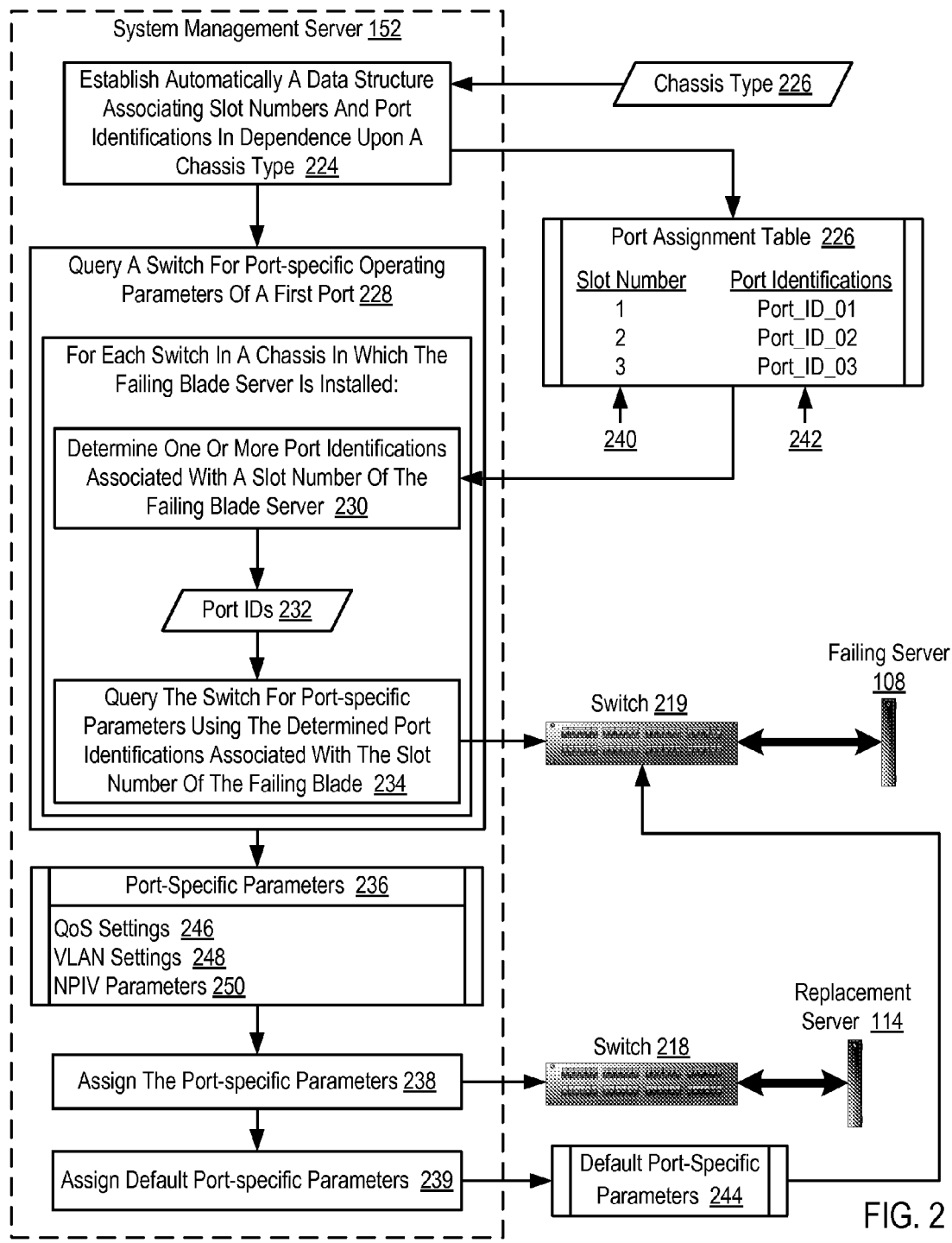
FIG. 2 sets forth a flow chart illustrating an exemplary method for migrating port-specific operating parameters during blade server failover according to embodiments of the present invention.

For further explanation, FIG. 2 sets forth a flow chart illustrating an exemplary method for migrating port-specific operating parameters during blade server failover according to embodiments of the present invention. The method of FIG. 2 includes establishing (224) automatically by a system management server (152) a data structure (226) associating slot numbers (240) and port identifications (242) in dependence upon a chassis type (226). As mentioned above, chassis of different types may be configured with ports physically connected to particular slots, where this configuration is static and cannot be changed. Establishing (224) automatically by a data structure (226) associating slot numbers (240) and port identifications (242) in dependence upon a chassis type (226) may be carried out by identifying from a list of blade chassis types, the associations of slot numbers and port identifications for the particular chassis type (226). The data structure associating slot numbers (240) and port identifications (242) in the example of FIG. 2 is depicted as a port assignment table (226). As an alternative to automatically establishing the data structure, a user may manually establish the data structure by associating slot numbers and port identifications. This manual establishment enables a user defined port assignment table in which a particular port of a chassis may be configured by a user to connect to any particular slot in the chassis.

The method of FIG. 2 also includes querying (228), by the system management server (152), at least one switch (219) connected at one or more ports to a failing blade server (108) for port-specific operating parameters (236) of the one or more ports connecting the failing blade server (108). In the example of FIG. 2, the port-specific operating parameters may include QoS settings (246) for Ethernet ports, VLAN settings (248) for Ethernet ports, NPIV Parameters (250) for Fibre Channel ports, or any other parameter that may be associated with a particular switch port as will occur those of skill in the art.

In the method of FIG. 2, querying (228) at least one switch (219) for port-specific operating parameters (236) is carried out by, for each switch in a chassis in which the failing blade server is installed: determining (230), from the data structure (236) associating slot numbers (240) and port identifications (232), one or more port identifications (240) associated with a slot number (240) of the failing blade server (108) and querying (234) the switch (219) for port-specific operating parameters (236) using the determined port identifications (232) associated with the slot number (240) of the failing blade (108). As mentioned above, when a blade server fails the BSMM monitoring the health of the blade server identifies the failure and sends an event notification to the system management server (152). Such an event notification typically includes a slot number of the failing blade server. The system management server may use the slot number from the event notification to determining a port identification associated with the slot number. After querying the switch for port-specific operating parameters, the method of FIG. 2 continues by assigning (238), in at least one switch (218) connected at one or more ports to a replacement blade server (113), the port-specific operating parameters (236) to the one or more ports connecting the replacement blade server (114).

The method of FIG. 2 also includes assigning (239), in the switch (219) connected at one or more ports to the failing blade server (108), default port-specific operating parameters (244) to the one or more ports connecting the failing blade server (108). Default port-specific operating parameters are blade-independent parameters, typically assigned to a port that is not use, either because a blade server connected to the port is not powered on or because there is no blade server connected to the port at all. Such blade-independent parameters in accordance with embodiments of the present invention may represent no actual parameters. That is, assigning default port-specific operating parameters typically results in clearing all port-specific, and therefore blade server specific, parameters from that port of the switch. In other cases, the default parameters may be parameters that are chassis dependent—minimum requirements for any blade server installed into the chassis.

Figure 3:
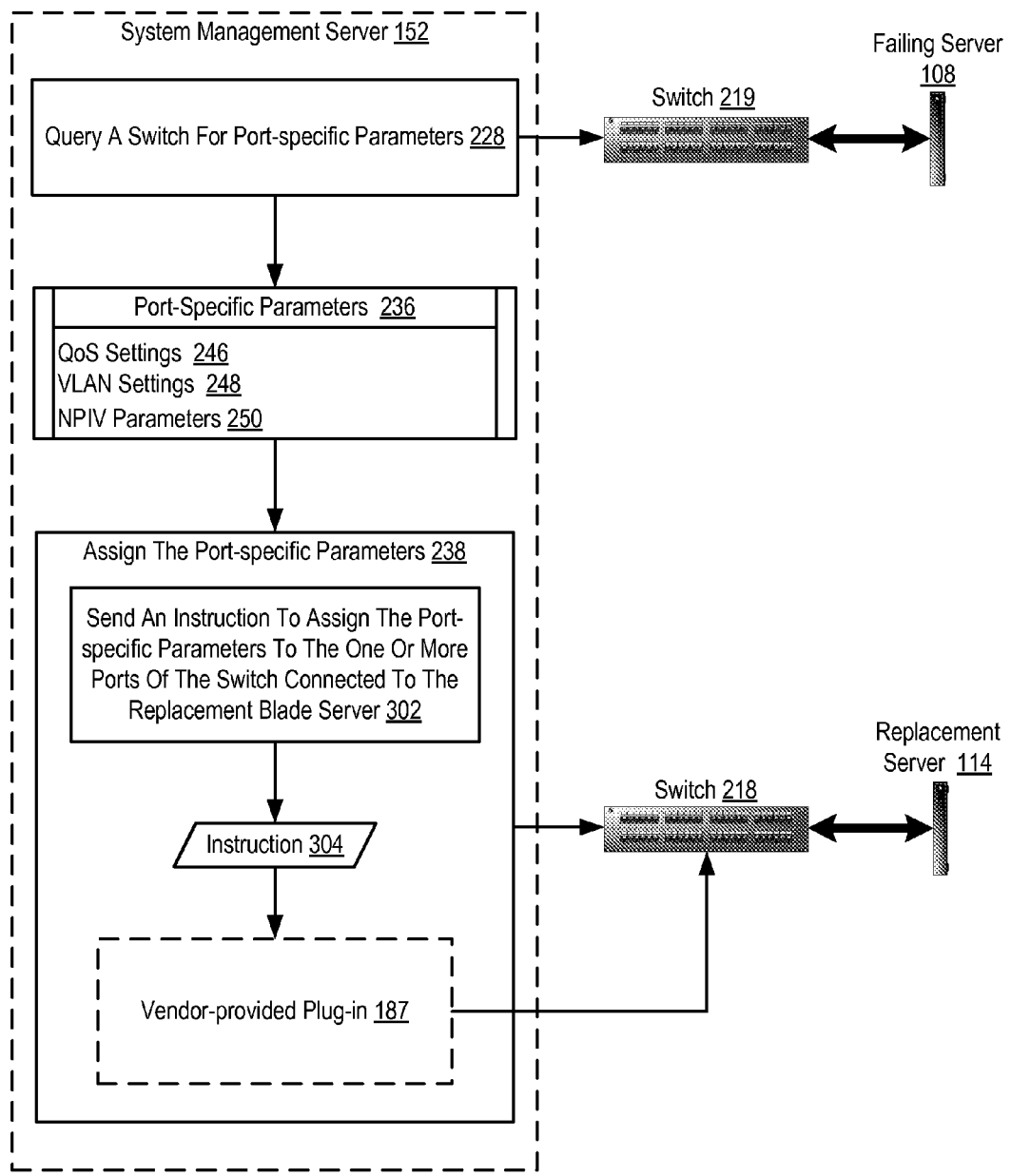
FIG. 3 sets forth a flow chart illustrating a further exemplary method for migrating port-specific operating parameters during blade server failover according to embodiments of the present invention.

For further explanation, FIG. 3 sets forth a flow chart illustrating a further exemplary method for migrating port-specific operating parameters during blade server failover according to embodiments of the present invention. The method of FIG. 3 is similar to the method of FIG. 2 including, as it does, the system management server's (152) querying (228) at least one switch (219) connected at one or more ports to a failing blade server (108) for port-specific operating parameters (236) of the one or more ports connecting the failing blade server (108), and assigning (238), in at least one switch (218) connected at one or more ports to a replacement blade server (114), the port-specific operating parameters (236) to the one or more ports connecting the replacement blade server (114).

The method of FIG. 3 differs from the method of FIG. 2, however, in that in the method of FIG. 3 assigning (238), in at least one switch (218) connected at one or more ports to a replacement blade server (114), the port-specific operating parameters (236) to the one or more ports connecting the replacement blade server (114) may be carried out by sending (302), to a vendor-provided plug-in (187) for the switch (218) connected to the replacement blade server (114), an instruction (304) to assign the port-specific operating parameters (236) to the one or more ports of the switch (218) connected to the replacement blade server (114). In the method of FIG. 3, the vendor-provided plug-in (187) is installed as part of the system management server (152). As mentioned above, a plug-in is a module of computer program instructions that interacts with a host application to provide a usually very specific function on demand. The vendor-provided plug-in (187) in the method of FIG. 3 is a module of computer program instructions that extends the capabilities of the system management server in that the plug-in is capable of receiving queries for port-specific operating parameters of a particular switch and retrieving such parameters. Accessing port-specific operating parameters on switches having various vendors may require vendor specific computer program instructions for each switch. To reduce complexity and size of the SMS application, a user may install only a single vendor plug-in for each switch currently in use in the data center, where each vendor plug-in provides the necessary computer program instructions for querying and assigning port-specific operating parameters for a particular switch.

Exemplary embodiments of the present invention are described largely in the context of a fully functional computer system for migrating port-specific operating parameters during blade server failover. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of migrating port-specific operating parameters during blade server failover, the method comprising:
    querying, by a system management server of a data center, a switch for port-specific operating parameters of a first port, the data center comprising blade servers coupled for data communications to one another and to the system management server by a network, the system management server comprising a computer subsystem that automates server management processes in the data center, the switch comprising a data communications component of the network, the switch comprising ports, the ports comprising physical points of connection between the switch and blade servers, each port having associated port-specific operating parameters, the switch connected at the first port to a failing blade server, wherein querying a switch for port-specific operating parameters of a first port further comprises:
    for each switch in a chassis in which the failing blade server is installed:
    determining, from a data structure associating slot numbers and port identifications, one or more port identifications associated with a slot number of the failing blade server; and
    querying the switch for port-specific operating parameters using the determined port identifications associated with the slot number of the failing blade; and
    assigning, by the system management server, the port-specific operating parameters to a second port in the same switch or another switch connected at the second port to a replacement blade server.

2. The method of claim 1 further comprising:
    establishing automatically by the system management server the data structure associating slot numbers and port identifications in dependence upon a chassis type.

3. The method of claim 1 wherein assigning the port-specific operating parameters to a second port in a same switch or another switch connected at the second port to a replacement blade server further comprises sending, to a vendor-provided plug-in for the switch connected to the replacement blade server, an instruction to assign the port-specific operating parameters to the second ports of the switch connected to the replacement blade server, the vendor-provided plug-in installed as part of the system management server.

4. The method of claim 1 wherein port-specific operating parameters further comprise any of Quality of Service ('QoS') settings, Virtual Local Area Network ('VLAN') settings, and N_Port ID Virtualization ('NPIV') parameters.

5. The method of claim 1 further comprising:
    assigning, by the system management server, default port-specific operating parameters to the first port in the switch connected at the first port to the failing blade server.

6. An apparatus for migrating port-specific operating parameters during blade server failover, the apparatus comprising a computer processor, a computer memory operatively coupled to the computer processor, the computer memory including computer program instructions capable of:

querying, by a system management server of a data center, a switch for port-specific operating parameters of a first port, the data center comprising blade servers coupled for data communications to one another and to the system management server by a network, the system management server comprising a computer subsystem that automates server management processes in the data center, the switch comprising a data communications component of the network, the switch comprising ports, the ports comprising physical points of connection between the switch and blade servers, each port having associated port-specific operating parameters, the switch connected at the first port to a failing blade server, wherein querying a switch for port-specific operating parameters of a first port further comprises:

for each switch in a chassis in which the failing blade server is installed:

determining, from a data structure associating slot numbers and port identifications, one or more port identifications associated with a slot number of the failing blade server; and querying the switch for port-specific operating parameters using the determined port identifications associated with the slot number of the failing blade; and assigning, by the system management server, the port-specific operating parameters to a second port in the same switch or another switch connected at the second port to a replacement blade server.

7. The apparatus of claim 6 further comprising computer program instructions capable of:

establishing automatically by the system management server the data structure associating slot numbers and port identifications in dependence upon a chassis type.

8. The apparatus of claim 6 wherein assigning the port-specific operating parameters to a second port in a same switch or another switch connected at the second port to a replacement blade server further comprises sending, to a vendor-provided plug-in for the switch connected to the replacement blade server, an instruction to assign the port-specific operating parameters to the second ports of the switch connected to the replacement blade server, the vendor-provided plug-in installed as part of the system management server.

9. The apparatus of claim 6 wherein port-specific operating parameters further comprise any of Quality of Service ('QoS') settings, Virtual Local Area Network ('VLAN') settings, and N_Port ID Virtualization ('NPIV') parameters.

10. The apparatus of claim 6 further comprising computer program instructions capable of:

assigning, by the system management server, default port-specific operating parameters to the first port in the switch connected at the first port to the failing blade server.

11. A computer program product for migrating port-specific operating parameters during blade server failover, the computer program product disposed in a computer readable medium, wherein the computer readable medium is not a signal, the computer program product comprising computer program instructions capable of:

querying, by a system management server of a data center, a switch for port-specific operating parameters of a first port, the data center comprising blade servers coupled for data communications to one another and to the system management server by a network, the system management server comprising a computer subsystem that automates server management processes in the data center, the switch comprising a data communications component of the network, the switch comprising ports, the ports comprising physical points of connection between the switch and blade servers, each port having associated port-specific operating parameters, the switch connected at the first port to a failing blade server, wherein querying a switch for port-specific operating parameters of a first port further comprises:

for each switch in a chassis in which the failing blade server is installed:

determining, from a data structure associating slot numbers and port identifications, one or more ort identifications associated with a slot number of the failing blade server; and querying the switch for port-specific operating parameters using the determined port identifications associated with the slot number of the failing blade; and assigning, by the system management server, the port-specific operating parameters to a second port in the same switch or another switch connected at the second port to a replacement blade server.

12. The computer program product of claim 11 further comprising computer program instructions capable of:

establishing automatically by the system management server the data structure associating slot numbers and port identifications in dependence upon a chassis type.

13. The computer program product of claim 11 wherein assigning the port-specific operating parameters to a second port in a same switch or another switch connected at the second port to a replacement blade server further comprises sending, to a vendor-provided plug-in for the switch connected to the replacement blade server, an instruction to assign the port-specific operating parameters to the second ports of the switch connected to the replacement blade server, the vendor-provided plug-in installed as part of the system management server.

14. The computer program product of claim 11 wherein port-specific operating parameters further comprise any of Quality of Service ('QoS') settings, Virtual Local Area Network ('VLAN') settings, and N_Port ID Virtualization ('NPIV') parameters.

15. The computer program product of claim 11 further comprising computer program instructions capable of:

assigning, by the system management server, default port-specific operating parameters to the first port in the switch connected at the first port to the failing blade server.

16. The computer program product of claim 11 wherein the computer readable medium comprises a recordable medium.

\* \* \* \* \*